(12) United States Patent
Rinner

(10) Patent No.: US 10,923,885 B2
(45) Date of Patent: Feb. 16, 2021

(54) SURGE PROTECTION COMPONENT AND METHOD FOR PRODUCING A SURGE PROTECTION COMPONENT

(71) Applicant: EPCOS AG, Munich (DE)

(72) Inventor: Franz Rinner, Deutschlandsberg (AT)

(73) Assignee: EPCOS AG, Munich (DE)

(*) Notice: Subject to any disclaimer, the term of this patent is extended or adjusted under 35 U.S.C. 154(b) by 399 days.

(21) Appl. No.: 15/763,003

(22) PCT Filed: Sep. 7, 2016

(86) PCT No.: PCT/EP2016/071110
§ 371 (c)(1),
(2) Date: Mar. 23, 2018

(87) PCT Pub. No.: WO2017/050579
PCT Pub. Date: Mar. 30, 2017

(65) Prior Publication Data
US 2018/0278026 A1    Sep. 27, 2018

(30) Foreign Application Priority Data
Sep. 25, 2015   (DE) .................. 10 2015 116 278

(51) Int. Cl.
*H01T 4/12*    (2006.01)
*H01T 4/16*    (2006.01)
(Continued)

(52) U.S. Cl.
CPC .............. *H01T 4/12* (2013.01); *H01G 4/005* (2013.01); *H01T 4/16* (2013.01); *H01T 21/00* (2013.01);
(Continued)

(58) Field of Classification Search
CPC .. H01T 4/12; H01T 4/16; H01T 21/00; H01T 21/06; H01G 4/005; H02H 9/041; H02H 9/06
See application file for complete search history.

(56) References Cited

U.S. PATENT DOCUMENTS 6,008,717 A * 12/1999  Kawase ................ H01C 1/14
                                                            338/20
7,633,735 B2 * 12/2009  Urakawa ................ H01T 4/12
                                                            361/112
(Continued)

FOREIGN PATENT DOCUMENTS

CN    103650071 A    3/2014
CN    103652271 A    3/2014
(Continued)

OTHER PUBLICATIONS

International Search Report in International Application No. PCT/EP2016/071110, dated Nov. 16, 2016, with English translation (5 pages).

*Primary Examiner* — Yusef A Ahmed
(74) *Attorney, Agent, or Firm* — Nixon Peabody LLP

(57) ABSTRACT

A surge protection component with a main body which has at least one inner electrode arranged between two ceramic layers, wherein the at least one inner electrode is set back from at least one lateral face of the main body, wherein a gas-filled cavity is provided between the at least one inner electrode and the at least one lateral face, and wherein an outer electrode is respectively arranged on two mutually opposite lateral faces of the main body. According to a further aspect, the present invention relates to a method for producing a surge protection component.

12 Claims, 3 Drawing Sheets

Figure 1:
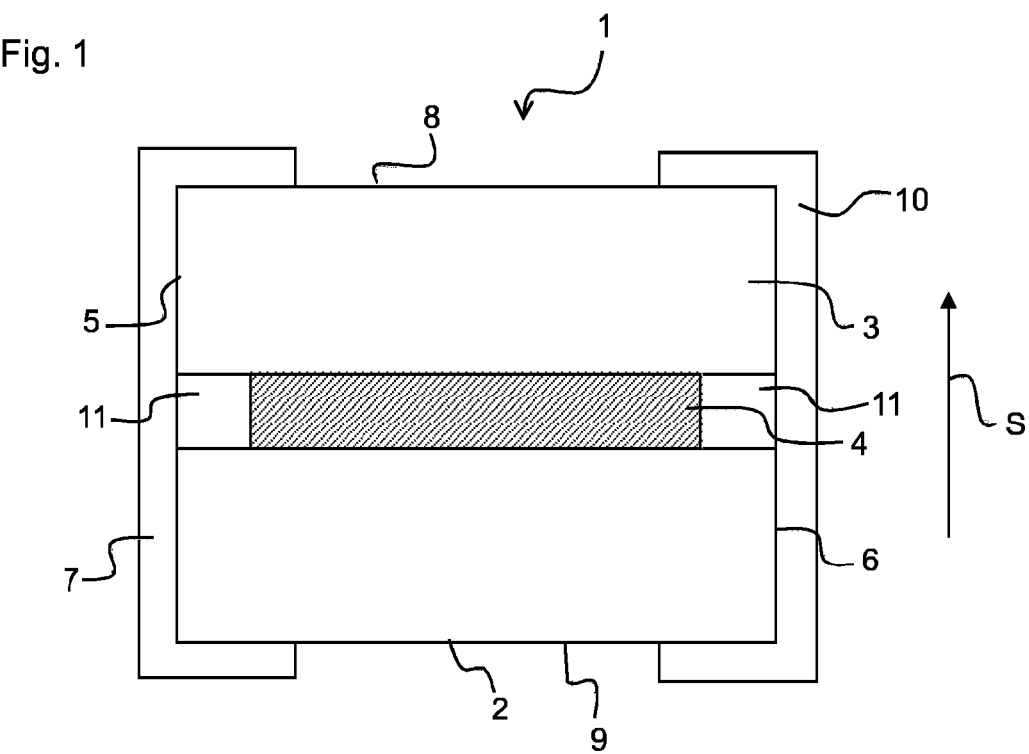

(51) Int. Cl.
*H01T 21/00* (2006.01)
*H01G 4/005* (2006.01)
*H01T 21/06* (2006.01)
*H02H 9/04* (2006.01)
*H02H 9/06* (2006.01)

(52) U.S. Cl.
CPC .............. *H01T 21/06* (2013.01); *H02H 9/041* (2013.01); *H02H 9/06* (2013.01)

(56) References Cited

U.S. PATENT DOCUMENTS

| | | | | |
|---|---|---|---|---|
| 8,238,069 | B2 * | 8/2012 | Adachi | H01T 4/12 361/56 |
| 8,471,672 | B2 * | 6/2013 | Feichtinger | H01T 1/16 338/20 |
| 8,885,324 | B2 * | 11/2014 | Bultitude | H01G 4/30 361/326 |
| 9,853,619 | B2 * | 12/2017 | Sato | H01G 4/30 |
| 2002/0089409 | A1 * | 7/2002 | Ishii | H01C 1/148 338/22 R |
| 2004/0165331 | A1 * | 8/2004 | McDonald, Jr. | H01T 4/06 361/119 |
| 2006/0133009 | A1 * | 6/2006 | Choi | H01G 4/12 361/306.3 |
| 2006/0279172 | A1 * | 12/2006 | Ito | H01C 7/18 310/328 |
| 2007/0285866 | A1 * | 12/2007 | Ueda | H01T 4/12 361/120 |
| 2009/0067113 | A1 * | 3/2009 | Urakawa | H01T 4/12 361/220 |
| 2009/0236692 | A1 * | 9/2009 | Su | H03H 1/02 257/533 |
| 2009/0296294 | A1 * | 12/2009 | Liu | H01T 21/00 361/56 |
| 2010/0254052 | A1 * | 10/2010 | Katsumura | H01T 4/12 361/56 |
| 2010/0309595 | A1 * | 12/2010 | Adachi | H01T 4/10 361/56 |
| 2011/0216456 | A1 * | 9/2011 | Yamamoto | H01T 4/12 361/56 |
| 2011/0222197 | A1 * | 9/2011 | Adachi | H05K 9/0067 361/56 |
| 2011/0222203 | A1 * | 9/2011 | Adachi | H01T 4/12 361/220 |
| 2011/0227196 | A1 * | 9/2011 | Adachi | H01T 1/20 257/537 |
| 2012/0134059 | A1 * | 5/2012 | Sumi | H01C 7/1006 361/56 |
| 2012/0162838 | A1 * | 6/2012 | Sawada | H01T 21/00 361/56 |
| 2012/0169452 | A1 * | 7/2012 | Hiehata | H01L 23/60 338/21 |
| 2012/0236450 | A1 * | 9/2012 | Adachi | H01T 4/12 361/56 |
| 2012/0300355 | A1 * | 11/2012 | Umeda | H01T 4/12 361/220 |
| 2013/0077199 | A1 * | 3/2013 | Ikeda | H01T 4/12 361/56 |
| 2013/0207770 | A1 * | 8/2013 | Rinner | H01C 7/041 338/22 R |
| 2014/0198422 | A1 * | 7/2014 | Jones | H01G 4/005 361/91.1 |
| 2014/0232485 | A1 | 8/2014 | Bultitude | |
| 2014/0240878 | A1 * | 8/2014 | Otsubo | H02H 9/04 361/56 |
| 2016/0105948 | A1 * | 4/2016 | Okamoto | C22C 32/001 361/220 |
| 2016/0218502 | A1 * | 7/2016 | De Leon | H02H 9/005 |
| 2017/0244223 | A1 * | 8/2017 | Yasunaka | H01T 21/00 |
| 2018/0062354 | A1 * | 3/2018 | Miki | H02H 9/044 |
| 2018/0114647 | A1 * | 4/2018 | Inoue | H01G 4/33 |
| 2020/0083570 | A1 * | 3/2020 | Koestner | H01M 2/1066 |

FOREIGN PATENT DOCUMENTS

| | | |
|---|---|---|
| DE | 102012105059 A1 | 12/2013 |
| JP | 3-230487 A | 10/1991 |
| JP | 9-190868 A | 7/1997 |
| JP | 10-312786 A | 11/1998 |
| JP | H11-354249 A | 12/1999 |
| JP | 2000-068029 A | 3/2000 |
| JP | 2000-133409 A | 5/2000 |
| JP | 2013-069561 A | 4/2013 |
| JP | 2014-523648 A | 9/2014 |
| WO | WO 2012/093081 A1 | 7/2012 |
| WO | 2013/009661 | 1/2013 |
| WO | 2013009661 A2 | 1/2013 |
| WO | WO 2013/009661 A2 | 1/2013 |

* cited by examiner

SURGE PROTECTION COMPONENT AND METHOD FOR PRODUCING A SURGE PROTECTION COMPONENT

CROSS-REFERENCE TO RELATED APPLICATIONS

This application is a U.S. National Stage of International Application No. PCT/EP2016/071110, filed Sep. 7, 2016, which claims the benefit of Germany Patent Application No. 102015116278.4, filed on Sep. 25, 2015, both of which are incorporated herein by reference in their entireties.

The present invention relates to a surge protection component and to a method for producing a surge protection component. Surge protection components can be used as short-circuiting switches in the event of an overvoltage and thus serve to protect a circuit arrangement connected to them from being damaged by an overvoltage.

The object of the present invention is to make available an improved surge protection component and a method for producing the latter.

This object is achieved by a surge protection component according to claim 1. The object is moreover achieved by a method according to the second independent claim.

A surge protection component is proposed having a main body which has at least one inner electrode arranged between two ceramic layers, wherein the at least one inner electrode is set back from at least one lateral face of the main body, wherein a gas-filled cavity is provided between the at least one inner electrode and the at least one lateral face, and wherein an outer electrode is respectively arranged on two mutually opposite lateral faces of the main body. The surge protection component can have more than one inner electrode, in which case each inner electrode is arranged between two ceramic layers. Each of the inner electrodes is set back from at least one lateral face of the main body, wherein a gas-filled cavity is provided between each of the respective inner electrode and the lateral face.

The gas-filled cavity can be used in particular as a spark gap. Accordingly, the gas-filled cavity has an insulating action if a voltage between the inner electrode and the outer electrodes does not exceed a predetermined breakdown voltage. If the breakdown voltage is exceeded, the gas arranged in the gas-filled cavity is ionized and the outer electrodes are connected conductively to each other via the inner electrode and the spark gap now formed in the cavity. A short circuit can thus occur. Since this short circuit is triggered in the surge protection component, a circuit arrangement connected to the surge protection component can be protected from damage.

The gas can be nitrogen or a noble gas, for example. Alternatively, the gas can be air or a gas mixture, for example. The gas mixture can have one or more of the substances argon, neon and hydrogen.

The surge protection component described above is characterized by a structure that takes up little space. Since the inner electrodes are set back from the lateral face, the spark gap can be integrated in the main body of the surge protection component. The set-back of the inner electrodes can be realized by a selective etching process in which the inner electrodes are set back in a deliberate manner from the lateral face by means of material of the inner electrodes being removed. This method makes it possible to produce very small cavities with a high degree of precision. For example, cavities with a length of between 5 and 20 μm, preferably with a length of 10 μm, can be produced. The desired breakdown voltages can be set in this way.

As is described here, a single inner electrode is sufficient for the surge protection component. In an alternative embodiment, the surge protection component can have several inner electrodes arranged over each other in a stacking direction. According to this alternative embodiment, the surge protection component can have an improved current-carrying capacity. Moreover, in the surge protection component according to the alternative embodiment, a breakdown can occur several times before the surge protection component becomes defective and has to be replaced.

A spark gap can be formed between the at least one inner electrode and the outer electrode arranged on the at least one lateral face. The spark gap can be triggered such that a short circuit of the two outer electrodes occurs when a voltage lying between the two outer electrodes exceeds the breakdown voltage.

The surge protection component can thus be constructed in such a way that the gas arranged in the cavity connects the two outer electrodes conductively to each other by means of a spark gap and by means of the at least one inner electrode when a voltage between the outer electrodes is greater than a breakdown voltage.

The at least one inner electrode can be set back from the respective lateral face on two mutually opposite lateral faces of the main body, wherein a gas-filled cavity is arranged between each of the at least one inner electrode and the respective lateral face. Such a surge protection component can be produced in a simple etching method in which the inner electrode is exposed to an etching solution on both lateral faces of the main body. To produce a surge protection component with an inner electrode that is set back from only one lateral face, the other lateral face has to be covered with a protective lacquer during the etching step. This method thus requires the additional steps of applying and removing the protective lacquer. Alternatively, a surge protection component with at least one inner electrode set back precisely from one lateral face can be produced by dipping the surge protection component into an etching solution. The component can be dipped in such a way that the second lateral face does not come into contact with the etching solution.

Moreover, a surge protection component in which the inner electrode is set back from both sides of the main body is characterized in that the breakdown voltage has no directional dependence, since the component has a symmetrical construction.

The inner electrode can have copper or consist of copper. The inner electrode can have tungsten or consist of tungsten. The outer electrodes can have copper or silver or consist of one of these materials.

The ceramic layers can have aluminum oxide, or aluminum oxide with added glass frit, or zirconium oxide. Ceramic layers which have aluminum oxide, or aluminum oxide with added glass frit, or zirconium oxide, are particularly suitable for the surge protection component since they tolerate the sintering process, are gas-tight and are moreover compatible with process of etching of the inner electrodes. Moreover, a surge protection component with a low capacitance is advantageous. For this reason, ceramic layers that have aluminum oxide, or aluminum oxide with added glass frit, or zirconium oxide, are suitable, since these materials have a low dielectric constant.

The main body can have a base surface whose side lengths each lie in a range of 0.1 mm to 3.0 mm. Base surface designates the surface whose surface normal is parallel to the stacking direction of the main body.

For example, the side lengths of the base surface can be 0.7 mm and 1.5 mm. It can be a 0603 component, a 0402 component, a 0201 component or a 01005 component. These codes relate to a definition of the dimensions of the component according to the EIA standard in force at the date of filing. For example, the code 01005 indicates that the component has a length of 0.4 mm and a width of 0.2 mm.

The surge protection component can be a surface mounted device (SMD). Accordingly, the surge protection component can be provided to be soldered on a printed circuit board. For this purpose, the surge protection component can have solderable attachment surfaces which can be formed, for example, by the outer electrodes.

Moreover, the outer electrodes can have an electroplated layer. This electroplated layer can be applied in an electroplating process after firing-in of an outer metallization.

A further aspect of the present invention relates to a method for producing a surge protection component. The latter can be the surge protection component described above. Accordingly, each structural or functional feature that has been disclosed in connection with the surge protection component can also pertain to the method. Conversely, each feature disclosed in connection with the method can pertain to the surge protection component.

The method has the steps of:
manufacturing a main body having at least one inner electrode arranged between two ceramic layers, wherein the at least one inner electrode reaches to the lateral faces of the main body, and
etching the at least one inner electrode on at least one lateral face of the main body, such that a cavity is formed between the at least one lateral face of the main body and the inner electrode,
applying two outer electrodes to two mutually opposite lateral faces of the main body.

The steps can preferably be carried out in the sequence indicated here. By application of the two outer electrodes, the cavity can be encapsulated.

By the etching of the at least one inner electrode, the cavity can be produced in a simple way. In addition, the etching allows the cavity to be produced with a high degree of precision at the desired depth.

The method can further have the step of filling the cavity with a gas. The gas can be a process gas which is enclosed in the firing-in of the outer electrodes. When using an outer electrode made of silver, the firing-in has to take place under a reducing atmosphere, for example a nitrogen atmosphere. The firing takes place under a reducing atmosphere, for example a nitrogen atmosphere, since the inner electrodes can have copper or tungsten and these materials require a reduced atmosphere. The at least one inner electrode can be etched on two mutually opposite lateral faces of the main body. Alternatively, the inner electrode can also be etched only on one lateral face of the main body.

The method can further have the step of sintering the main body, wherein this step is carried out before the etching of the inner electrodes.

The step of etching the inner electrodes can be carried out using an etching solution, which can be a solution based on sodium persulfate, sulfuric acid or iron(III) chloride.

The present invention is described below with reference to the figures.

Figure 2:
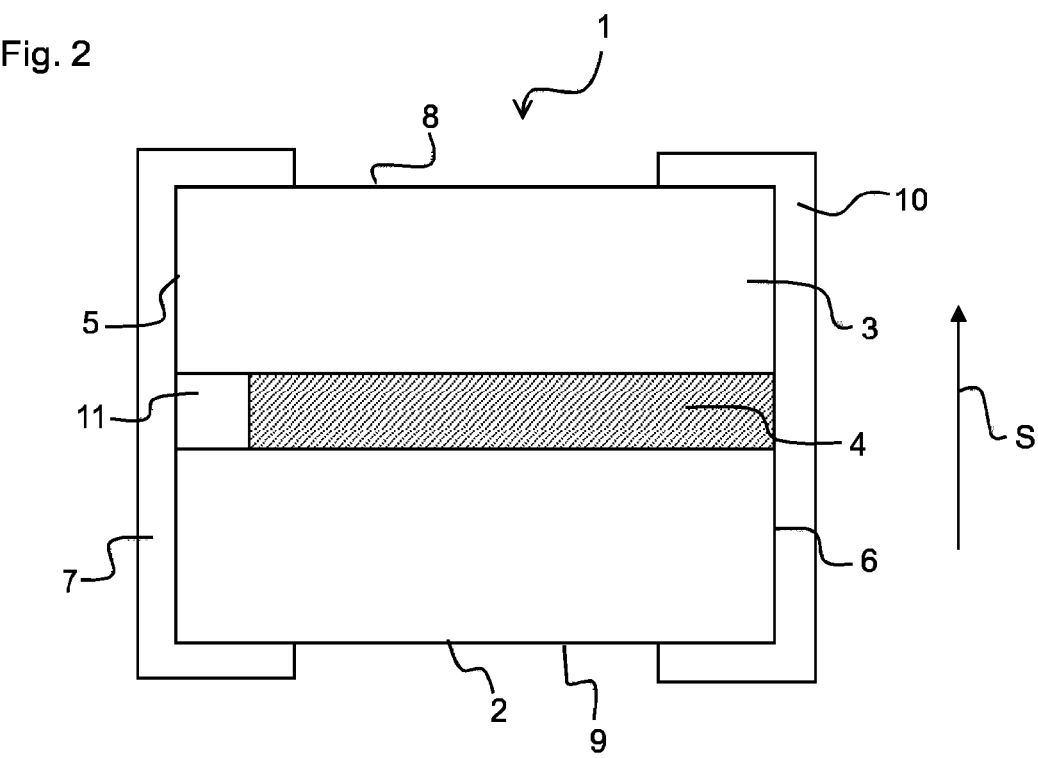
Figure 3:
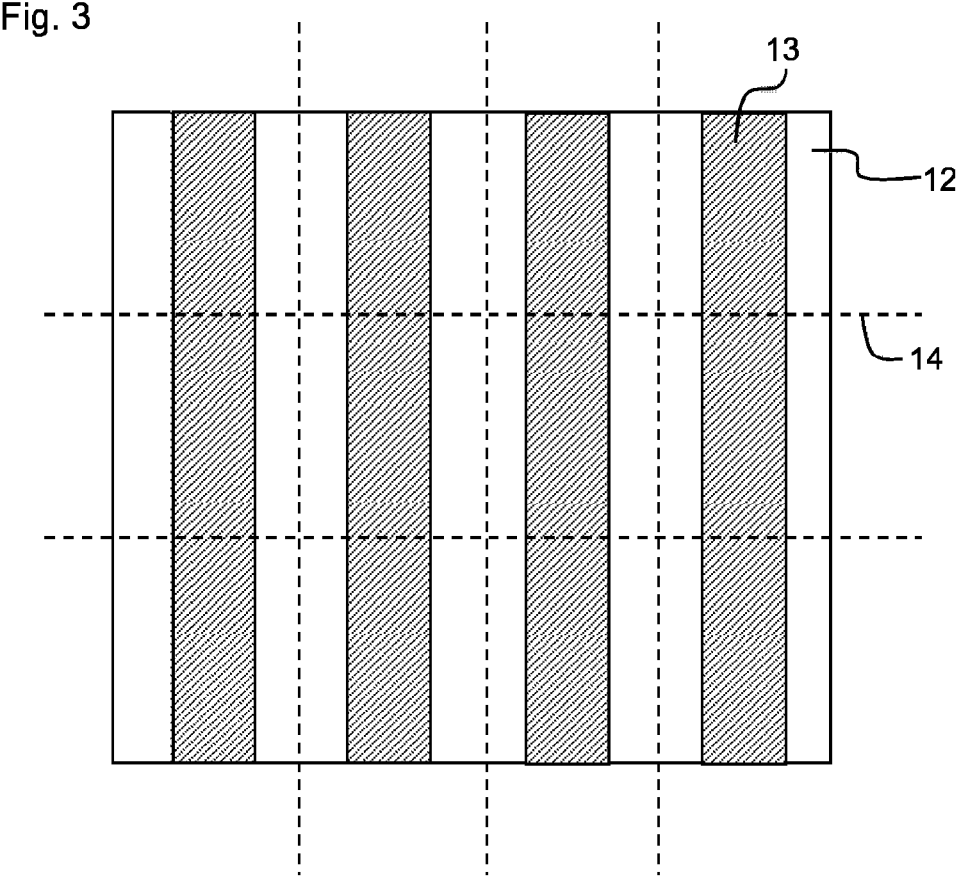
Figure 4:
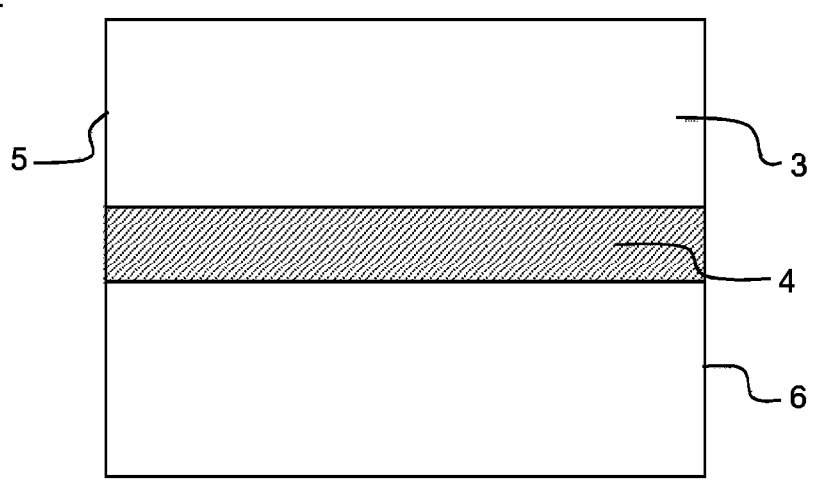
Figure 5:
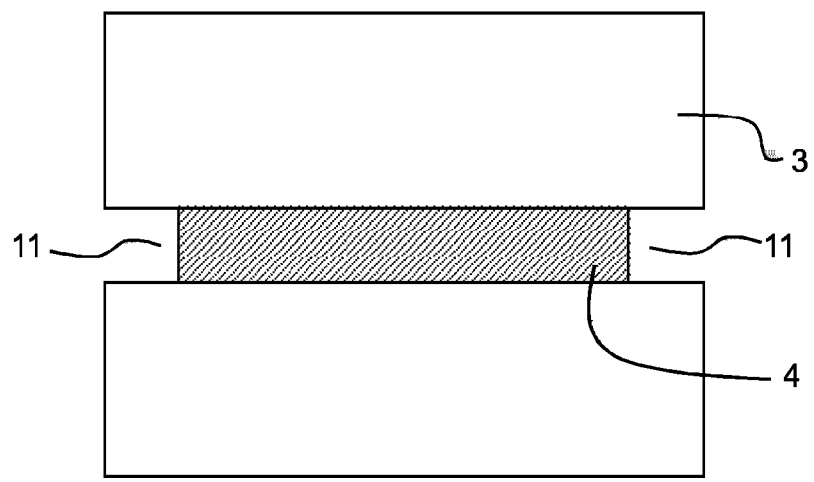
Figure 6:
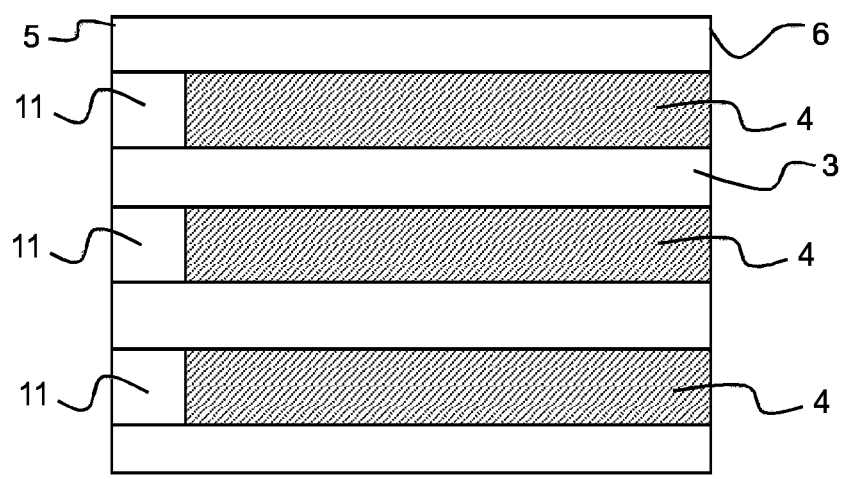

FIG. 1 shows a surge protection component according to a first illustrative embodiment, FIG. 2 shows a surge protection component according to a second illustrative embodiment, FIG. 3 shows a surge protection component during a production method, FIG. 4 shows the surge protection component at a later time during the production method, FIG. 5 shows the surge protection component at a still later time of the method, FIG. 6 shows the surge protection component in an alternative method setup.

FIG. 1 shows a surge protection component 1 according to a first illustrative embodiment. The surge protection component 1 has a main body 2. The main body 2 has two ceramic layers 3. Moreover, the main body 2 has an inner electrode 4, which is arranged in a stacking direction S between the two ceramic layers 3.

The main body 2 has a first lateral face 5 and a second lateral face 6, wherein the second lateral face 6 lies opposite the first lateral face 5. A first outer electrode 7 is arranged on the first lateral face 5 of the main body 2. The first outer electrode 7 covers the first lateral face 5 completely and moreover covers a top 8 and a bottom 9 of the main body 2 in each case partially. A second outer electrode 10 is arranged on the second lateral face 6 of the main body 2. The second outer electrode 10 covers the second lateral face 6 of the main body 2 completely and likewise partially covers the top 8 and the bottom 9 of the main body 2.

The first and the second lateral face 5, 6 are each oriented in such a way that their surface normals are perpendicular to the stacking direction S. The top 8 and the bottom 9 are oriented in such a way that their surface normals are parallel to the stacking direction S. The top 8 and the bottom 9 are parallel to the inner electrode 4.

The inner electrode 4 is set back from the first lateral face 5 of the main body 2. Accordingly, a cavity 11 is formed between the first outer electrode 7 and the inner electrode 4. This cavity 11 is filled with a gas.

Moreover, the inner electrode 4 is also set back from the second lateral face 6, such that a cavity 11 is likewise formed between the second outer electrode 10 and the inner electrode 4. This cavity 11 is also filled with a gas.

The surge protection component 1 can be used in particular as an arrester. It thus serves as a short-circuiting switch in the event of an overvoltage. The surge protection component 1 permits surge protection for a further circuit arrangement connected to it.

A short circuit in the surge protection component can be realized by a spark gap which is configured in the gas-filled cavities 11. The first outer electrode 7 and the second outer electrode 10 can each be connected to the associated switch arrangement. Accordingly, an electrical potential can lie at the first outer electrode 7 and at the second outer electrode 10. The inner electrode 4 can be used as what is called a floating electrode, such that no electrical potential lies on it.

The gas arranged in the gas-filled cavity 11 initially has an insulating action. However, if the potential difference between one of the outer electrodes 7, 10 and the inner electrode 4 exceeds a breakdown voltage, the gas is ionized and forms a spark gap via which the respective outer electrode 7, 10 is connected conductively to the inner electrode 4. If the potential difference between the respective other outer electrode 7, 10 and the inner electrode 4 is also greater than the breakdown voltage, the gas in the respective other cavity 11 is also ionized and a further spark gap is formed. The two outer electrodes 7, 10 can now be connected to each other conductively via the spark gaps and the inner electrode 4. This can result in a short circuit.

The breakdown voltage is defined by the distance between the inner electrode 4 and the two outer electrode 7, 10, the used filling gas and the filling pressure. The breakdown voltage can be calculated using Paschen's law. The surge protection component 1 can be designed for a breakdown voltage of 100 V or more.

The inner electrode 4 can have copper or consist of copper. Alternatively, the inner electrode 4 can have tungsten or consist of tungsten. In the surge protection component 1 shown in FIG. 1, the outer electrodes 7, 10 are not connected directly to the inner electrode 4. Therefore, another material can be used for the outer electrodes 7, 10 than for the inner electrode 4. The outer electrodes 7, 10 can have silver for example.

FIG. 2 shows a surge protection component 1 according to a second illustrative embodiment. The surge protection component 1 according to the second illustrative embodiment differs from the surge protection component 1 shown in FIG. 1 in that a cavity 11 is provided only between the inner electrode 4 and the first outer electrode 7. The inner electrode 4 is routed as far as the second lateral face 6 of the main body 2 and accordingly bears on the second outer electrode 10. The second outer electrode 10 and the inner electrode 4 are electrically contacted to each other. The inner electrode 4 is not therefore used as a floating electrode. Instead, the same potential lies at the inner electrode 4 as at the second outer electrode 10.

The surge protection component 1 according to the second illustrative embodiment is characterized by a low limit voltage. The spark gap here only has to overcome one cavity 11 in order to short-circuit the two outer electrode 7, 10 to each other. Therefore, this is possible at a lower voltage than in the first illustrative embodiment.

In the second illustrative embodiment, outer electrodes 7, 10 can preferably be used that have the same material as the inner electrode 4. Here, the inner electrode 4 and the outer electrodes 7, 10 have copper, for example.

A method for producing the surge protection component 1 according to the first illustrative embodiment is described below with reference to FIGS. 3 to 5.

FIG. 3 shows a printed green sheet 12 from which a multiplicity of surge protection components 1 are produced. A ceramic layer 3 of the main body 2 is later produced from the green sheet 12. Strips of an electrically conductive material 13 are printed onto the green sheet 12 and from them the inner electrodes 4 of the surge protection component 1 are produced. The material 13 can be a copper paste.

In order to increase the number of breakdowns before failure of the surge protection component, it is possible, instead of a single inner electrode 4 arranged between two ceramic layers, to use several narrower inner electrodes 4 lying alongside one another. In this case, instead of the one strip of copper paste, several strips of copper paste would be applied. In such a configuration of the surge protection component 1, however, the current capacity of the component 1 could decrease.

The printed green sheets 12 are now stacked on top of each other. In the green state, each component 1 can have one or more printed sheets. To produce a surge protection component 1 according to the first illustrative embodiment, a stack is formed from a printed green sheet and an unprinted green sheet. To produce an alternative surge protection component 1 with several inner electrodes 4 arranged over each other in the stacking direction, several printed green sheets can be stacked on top of each other.

After the stacking procedure, the stack of printed green sheets 12 is pressed. In a following method step, the green sheets 12 are singulated along the partition line 14 indicated by broken lines in FIG. 3.

The stack is then sintered and optionally scoured. FIG. 4 shows a surge protection component 1 after these two steps.

In a further method step, the inner electrodes 4 are etched on at least one lateral face 5, 6 of the main body 2, such that a cavity 11 forms between the at least one lateral face 5, 6 of the main body 2 and the inner electrode 4. FIG. 5 shows a component 1 after this step has been carried out, wherein the inner electrode 4 has been etched here on the first lateral face 5 and on the second lateral face 6. The etching step is carried out in such a way that material is removed from the inner electrode 4. This results in an etching trench which forms the cavity 11 in the surge protection component 1. Depending on the duration of the etching step and on the etching solution used, the depth of the etching trench can be set to a desired value.

For the step of etching the inner electrode 4, the component is subjected to an etching solution, for example a solution based on sodium persulfate, sulfuric acid or iron (III) chloride. The length of the set-back region, which corresponds to the length of the cavity 11, can be between 5 and 20 um, for example. The method can be a wet-chemical etching method.

In a further method step, the outer electrodes 7, 10 are now applied to the first lateral face 5 and the second lateral face 6. The outer electrodes 7, 10 can be generated, for example, by the stack shown in FIG. 4 being dipped into a metallization paste and by the metallization paste then being fired in. Moreover, the metallization paste could be electroplated in order to generate an electroplated layer on the outer electrode.

In the method step of applying the outer electrode 7, 10, the cavities 11 are encapsulated. Accordingly, in this method step, the cavities 11 must also be filled with the gas. This results in the surge protection component 1 shown in FIG. 1.

FIG. 6 shows the surge protection component 1 after an alternative etching method has been carried out in which the inner electrode 4 has been etched selectively only on the first lateral face 5. In this case, the second lateral face 6 of the main body is masked prior to the etching process. For example, the main body 2 can be dipped with the second lateral face 6 into a protective lacquer prior to the etching process. Alternatively, the main body 2 can be dipped only with the first lateral face 5 into an etching solution, such that the second lateral face 6 does not come into contact with the etching solution and, accordingly, the inner electrode 4 is not etched on the second lateral face 6. The inner electrode 4 thus ends flush with the second lateral face 6 and is set back from the first lateral face 5.

The surge protection component shown in FIG. 6 has several inner electrodes 4 arranged over each other, wherein a ceramic layer 3 is arranged between two inner electrodes 4 in each case.

LIST OF REFERENCE SIGNS

1 surge protection component
2 main body
3 ceramic layer
4 inner electrode
5 first lateral face
6 second lateral face
7 first outer electrode
8 top
9 bottom
10 second outer electrode
11 cavity
12 green sheet 13 electrically conductive material
14 partition line
S stacking direction

The invention claimed is:

1. A surge protection component having a main body which has at least one inner electrode arranged between two ceramic layers, wherein the at least one inner electrode abuts each of the two ceramic layers, wherein the main body includes a first lateral face and a second lateral face, wherein a first outer electrode covers the first lateral face and a second outer electrode covers the second lateral face,
   wherein the at least one inner electrode is set back from the first outer electrode, and a first gas-filled cavity is provided between the at least one inner electrode and the first outer electrode, and
   wherein the at least one inner electrode is set back from the second outer electrode, and a second gas-filled cavity is provided between the at least one inner electrode and the second outer electrode.

2. The surge protection component according to claim 1, constructed in such a way that the gas arranged in the first and second cavities connects respective ones of the first and second outer electrodes conductively to each other by means of a spark gap and by means of the at least one inner electrode when a voltage greater than a breakdown voltage is applied between the first and second outer electrodes.

3. The surge protection component according to claim 1, wherein the at least one inner electrode has copper or tungsten.

4. The surge protection component according to claim 1, wherein the first and second outer electrodes have copper or silver.

5. The surge protection component according to claim 1, wherein the ceramic layers have aluminum oxide, or aluminum oxide with added glass frit, or zirconium oxide.

6. The surge protection component according to claim 1, wherein the main body has a base surface whose side lengths each lie in a range of 0.1 mm to 3.0 mm.

7. The surge protection component according to claim 1, wherein the surge protection component is a surface mounted device.

8. A method for producing a surge protection component, having the steps of:
   manufacturing a main body having at least one inner electrode arranged between two ceramic layers, wherein the at least one inner electrode abuts each of the two ceramic layers, wherein the main body includes a first lateral face and a second lateral face, wherein a first outer electrode covers the first lateral face and a second outer electrode covers the second lateral face; and
   etching the at least one inner electrode on at least one of the first and second lateral faces of the main body, such that a first gas-filled cavity is formed between the at least one inner electrode and the first outer electrode, and wherein the at least one inner electrode is set back from the second outer electrode, and a second gas-filled cavity is provided between the at least one inner electrode and the second outer electrode.

9. The method according to claim 8, further having the step of:
   filling the first and second cavities with gas.

10. The method according to claim 8, wherein the at least one inner electrode is etched on the first and second lateral faces that are mutually opposite one another.

11. The method according to claim 8, further having the step of:
   sintering the main body, wherein this step is carried out before the etching of the at least one inner electrode.

12. The method according to claim 8, wherein the step of etching the at least one inner electrode is carried out using an etching solution based on sodium persulfate, sulfuric acid or iron(III) chloride.

* * * * *